UNITED STATES PATENT OFFICE.

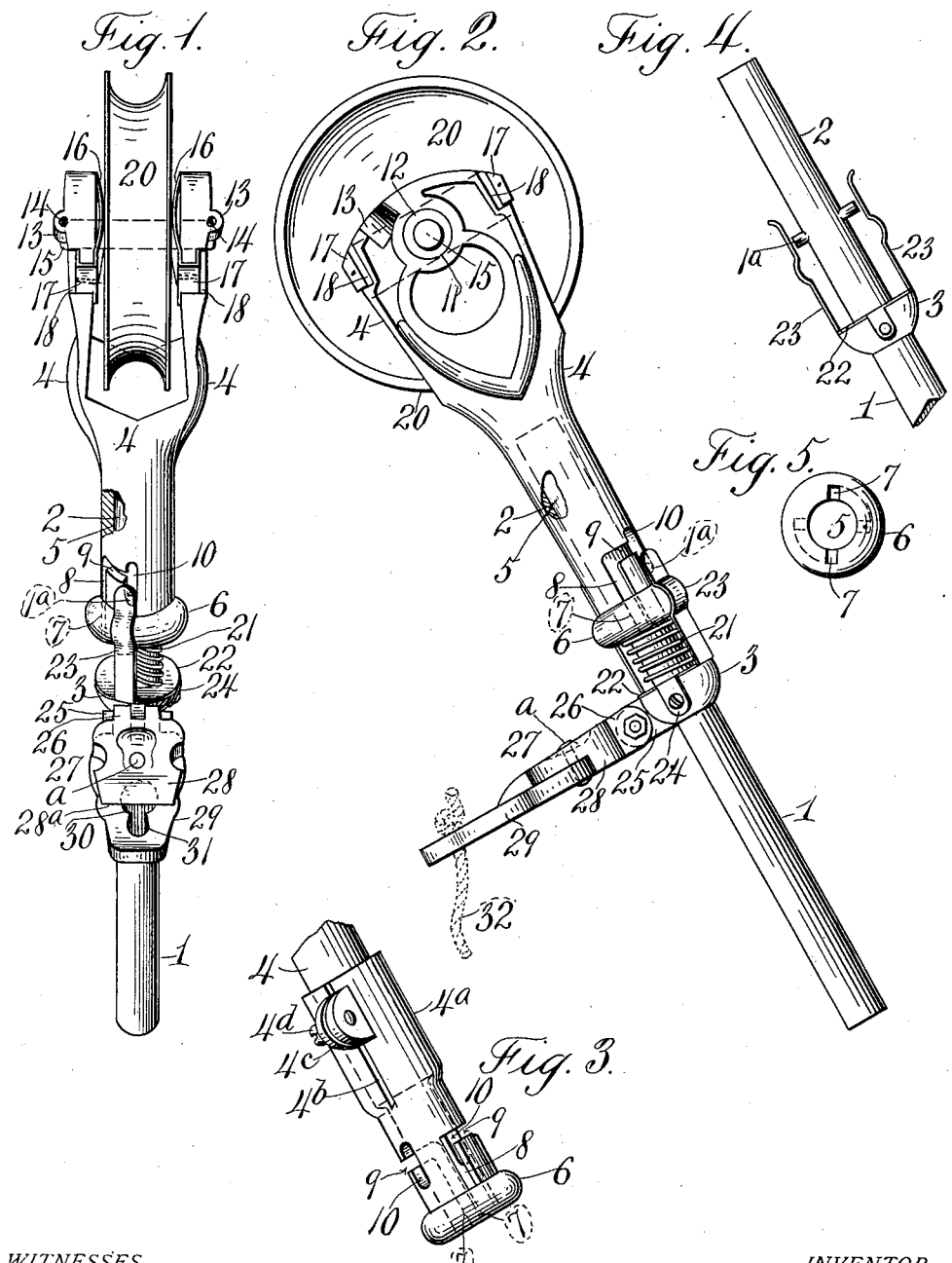

JOHN J. BARNICK, OF BLOOMSBURG, PENNSYLVANIA.

TROLLEY HARP OR HEAD.

1,095,182. Specification of Letters Patent. Patented May 5, 1914.

Application filed April 22, 1911. Serial No. 622,648.

*To all whom it may concern:*

Be it known that I, JOHN J. BARNICK, a citizen of the United States, residing at Bloomsburg, in the county of Columbia and State of Pennsylvania, have invented certain new and useful Improvements in Trolley Harps or Heads, of which the following is a specification.

This invention relates to a detachable, quick-change, self-locking trolley harp or head as an article of manufacture.

The object of my invention is to provide a trolley head or harp which can be quickly attached to, or detached from, the trolley pole, and which will be self-locking, or will be automatically locked in place when pressed on the pole, whereby the head or harp can be quickly changed in case a wheel breaks, a bushing gives out or becomes unevenly worn, or a contact spring breaks when the car is in use. This is of great practical advantage, as it enables the motorman to change the defective harp and replace it with a perfect one in a minute, whereas it will usually require from fifteen minutes to a half hour to repair a worn or broken part of a fixed head or harp, which delay of a car means a greater loss to the operating company than the cost of half a dozen detachable heads or harps.

Another object is to provide, in a detachable head or harp, improved upper and lower contact springs for making good electric connections to the trolley wheel; also to provide other details of construction for making a more economical and effective trolley head or harp.

The matter constituting my invention herein will be defined in the claims.

I will now describe the details of construction of my improved device by reference to the accompanying drawings, in which—

Figure 1 represents a rear edge view of a trolley head embodying my improvement. Fig. 2 represents a side elevation thereof. Fig. 3 represents the lower end of a head or harp, in the nature of a sleeve, containing modified features of construction. Fig. 4 represents a short section of the shank of a pole, showing opposite engaging pins and contact springs or arms. Fig. 5 represents a lower end view of the stem of a harp, showing opposite inner grooves leading to slots for the engaging pin shown in Fig. 4.

The usual trolley pole 1 is provided near its upper end with a collar 3 and a shank 2 extending beyond the same for fitting into a socket of the stem of a harp 4. The stem of this harp is provided with a longitudinal socket 5 and at its lower end with a collar 6 having in its opposite inner faces longitudinal grooves 7 leading to the opposite longitudinal slots 8 which are connected by transverse slots 9 with another set of longitudinal slots 10. The slots 10 project longitudinally beyond the transverse slots 9 and down to the collar 6, as clearly shown in the drawing. A cross pin 1ª is driven through a transverse hole in the shank so as to project on diametrically opposite sides and be adapted for engaging with the grooves and slots above described in the lower end of the stem of the harp.

In the opposite members of the fork and near the outer ends thereof are provided the opposite openings 11, in which are secured two steel bushing rings 12 by means of screws 14 passing through the side lugs or bosses 13. In these bushings 12 is inserted and secured a transverse axle 15 on which is mounted the usual trolley wheel 20. To the upper inner faces of the harp members are secured the upper contact springs 16, having the inwardly turned and overlapping clips or clamps 17 resting at their inwardly turned ends in recesses 18 in the inner faces of the harp members. Rivets are passed through these inwardly turned ends 17 for holding them in place. It will be seen that these contact springs are in convenient position at the ends of the harp members for readily detaching them and replacing them with new ones when required. The springs will preferably be provided with central openings for the passage of the axle 15. Washers will usually be inserted between the inner faces of the springs and the trolley wheel.

On the collar 3 of the pole is secured an annular contact plate 22 having two spring contact arms 23 which are slightly curved outward at their upper ends and provided with grooves or recesses for embracing the collar 6 at the lower end of the harp stem, as shown. This annular plate 22 is also provided with one or more downwardly projecting ears 24 which are perforated and through which screws are inserted to engage with the collar 3. The collar 3 is also provided with an ear 25 with which is connected a pair of ears or lugs 26 on one member 28 of a rope attaching device 27. This member 28 is made with a lower or outer sharp edge 28ª and is provided with a recess or cut-away portion for receiving the outer member 29 of the device. This member 29 is in the nature of a slotted swinging keeper which is pivotally connected by a pin a with the member 28, and is provided with a central opening 30 and a comparatively narrow or contracted slot 31 leading therefrom toward the outer end of the keeper. A knotted cord, or a cord before being knotted may be slipped through the central opening 30 and then formed into a knot, and the rope then pressed down into the contracted slot 31. For the purpose of inserting the rope the keeper 29 is swung to one side on its pin a so as to fully expose its central opening 30. In this position the cord or rope can be readily passed through the central opening and pushed down into the slot 31, after which the keeper will be turned into the normal engaging position shown by full lines in the drawing, so that the sharp edge 28ª of the member 28 will bear upon the cord and keep it in the slot 31, as shown. This constitutes a quick and reliable rope detaching device as a part of my detachable head or harp. A coiled locking spring 21 is fitted around the shank 2 of the pole and bears upon the annular contact plate 22 with its upper end free until the harp with its socketed stem is placed in position. The spring then bears against the collar 6 and assists in making good contact between the pole and the stem of the harp.

The stem of the harp may be made in the nature of a sleeve 4ª, as shown in Fig. 3, said sleeve having a longitudinal slot 4ᵇ and adjacent perforated ears or lugs 4ᶜ which may be engaged and drawn together by a clamping screw 4ᵈ. The lower end of this sleeve or socket is constructed with grooves and slots 7, 8, 9, 10, the same as shown in Figs. 1 and 2. In this socket the stem of an ordinary head or harp may be inserted and clamped by means of the ears 4ᶜ and screw 4ᵈ, so that any trolley head now in use may be inserted therein and used with the quick-change devices above described.

When it is desired to insert a detachable trolley head or harp upon a pole, the socketed portion of the stem is slid over the shank so that the grooves 7 will pass over the engaging pins 1ª, and by pressure against the spring 21 the socket stem will be forced downward so that the grooves 8 shall slide over said pins 1ª, then by turning the socketed stem to the right, the transverse grooves will slide over said pins until the pins are received in the longitudinal slots 10. The coiled spring 21 will now force out the socketed stem so as to bring the pins 1ª into the lower ends of the slots 10. Evidently this movement can be very quickly performed and will securely lock the head or harp upon the pole and the coiled spring 21 will assist in making good electrical contact and connection between the parts. In the movement above described the spring contact arms 23 will be readily forced outward so as to receive and embrace the collar 6 at the lower end of the socketed stem.

Having described my invention, what I claim, and desire to secure by Letters Patent, is—

1. The combination with a trolley pole, having at its outer end a shank, a collar at the lower end of the shank, said shank having two projecting pins above the collar, of a trolley head having a stem provided with a longitudinal socket and at its lower end with a pair of interior grooves and longitudinal slots extending therefrom through the metal, a second set of longitudinal slots, and transverse slots connecting each pair of longitudinal slots for receiving and engaging said pins on the shank, and a coiled locking spring between the collar on the pole and the stem of the trolley head for forcing said stem against the pins in the slot to hold the detachable head in place on the pole.

2. The combination with a trolley pole having a shank, projecting pins and a collar at the lower end of the shank, of a head having a stem provided with a socket and at its lower end with interior grooves, longitudinal slots extending from the grooves through the metal, and connecting transverse slots for engaging the said pins, a coiled locking spring bearing on the collar and the lower end of the stem, and outer spring contact arms connecting with the collar on the shank and adapted to bear at their outer ends on the stem of the head.

3. The combination with a trolley pole, and a detachable quick-change head and stem therefor, said stem having a socket and a lower collar, and means for engaging said stem with the pole, of a collar and a pair of spring-contact arms secured to the pole below its upper end or shank and adapted to embrace the collar and stem of the head for making electric contact, substantially as described.

In testimony whereof I affix my signature in presence of two witnesses.

JOHN J. BARNICK.

Witnesses:
S. F. PEACOCK,
T. C. HARTER.

Copies of this patent may be obtained for five cents each, by addressing the "Commissioner of Patents, Washington, D. C."